(12) United States Patent
Panizzolo et al.

(10) Patent No.: US 8,696,509 B2
(45) Date of Patent: Apr. 15, 2014

(54) POWER SPLIT TRANSMISSION

(75) Inventors: Fabrizio Panizzolo, Padua (IT); Ettore Cosoli, Padua (IT)

(73) Assignee: Dana Italia SpA, Arco (IT)

( * ) Notice: Subject to any disclaimer, the term of this patent is extended or adjusted under 35 U.S.C. 154(b) by 544 days.

(21) Appl. No.: 12/804,623

(22) Filed: Jul. 26, 2010

(65) Prior Publication Data

US 2011/0021302 A1    Jan. 27, 2011

Related U.S. Application Data

(60) Provisional application No. 61/228,646, filed on Jul. 27, 2009.

(51) Int. Cl.
*F16H 37/06* (2006.01)

(52) U.S. Cl.
USPC .......................... 475/218; 475/329; 475/343

(58) Field of Classification Search
USPC .................................. 475/75, 218, 329, 343
See application file for complete search history.

(56) References Cited

U.S. PATENT DOCUMENTS

| | | | |
|---|---|---|---|
| 4,446,756 A * | 5/1984 | Hagin et al. .................... 475/75 |
| 5,496,223 A | 3/1996 | Jarchow | |
| 5,643,122 A | 7/1997 | Fredriksen | |
| 5,868,640 A | 2/1999 | Coutant | |
| 6,394,925 B1 | 5/2002 | Wontner | |
| 6,440,026 B1 | 8/2002 | Johnson | |
| 2008/0171626 A1 | 7/2008 | Pollman | |
| 2008/0214348 A1 | 9/2008 | Hasegawa | |
| 2009/0270212 A1 * | 10/2009 | Ueda et al. ...................... 475/74 |
| 2010/0184551 A1 * | 7/2010 | Hiraoka et al. ................. 475/80 |
| 2011/0015022 A1 * | 1/2011 | Stoeckl et al. .................. 475/83 |

FOREIGN PATENT DOCUMENTS

| | | |
|---|---|---|
| EP | 1273828 A2 | 1/2003 |
| EP | 1855029 A2 | 11/2007 |
| WO | WO 2008/019799 A2 | 2/2008 |
| WO | WO 2009/047037 A1 | 4/2009 |
| WO | WO 2009/047038 A1 | 4/2009 |
| WO | WO2009/047042 A1 | 4/2009 |

\* cited by examiner

*Primary Examiner* — Justin Holmes
*Assistant Examiner* — Stacey Fluhart
(74) *Attorney, Agent, or Firm* — Marshall & Melhorn, LLC

(57) ABSTRACT

A transmission has a directional mechanism, a planetary gear mechanism, a stepped transmission and a continuously variable ratio device. The directional mechanism has at least one direction clutch. The planetary gear mechanism is connected to the direction mechanism and has at first planetary gear set and a second planetary gear set. The stepped transmission is connected to the planetary gear mechanism and has at least one speed clutch. The planetary gear mechanism is connected to a hydrostatic motor of the continuously variable ratio device. The motor is connected to a variable displacement pump of the continuously variable ratio device.

16 Claims, 1 Drawing Sheet

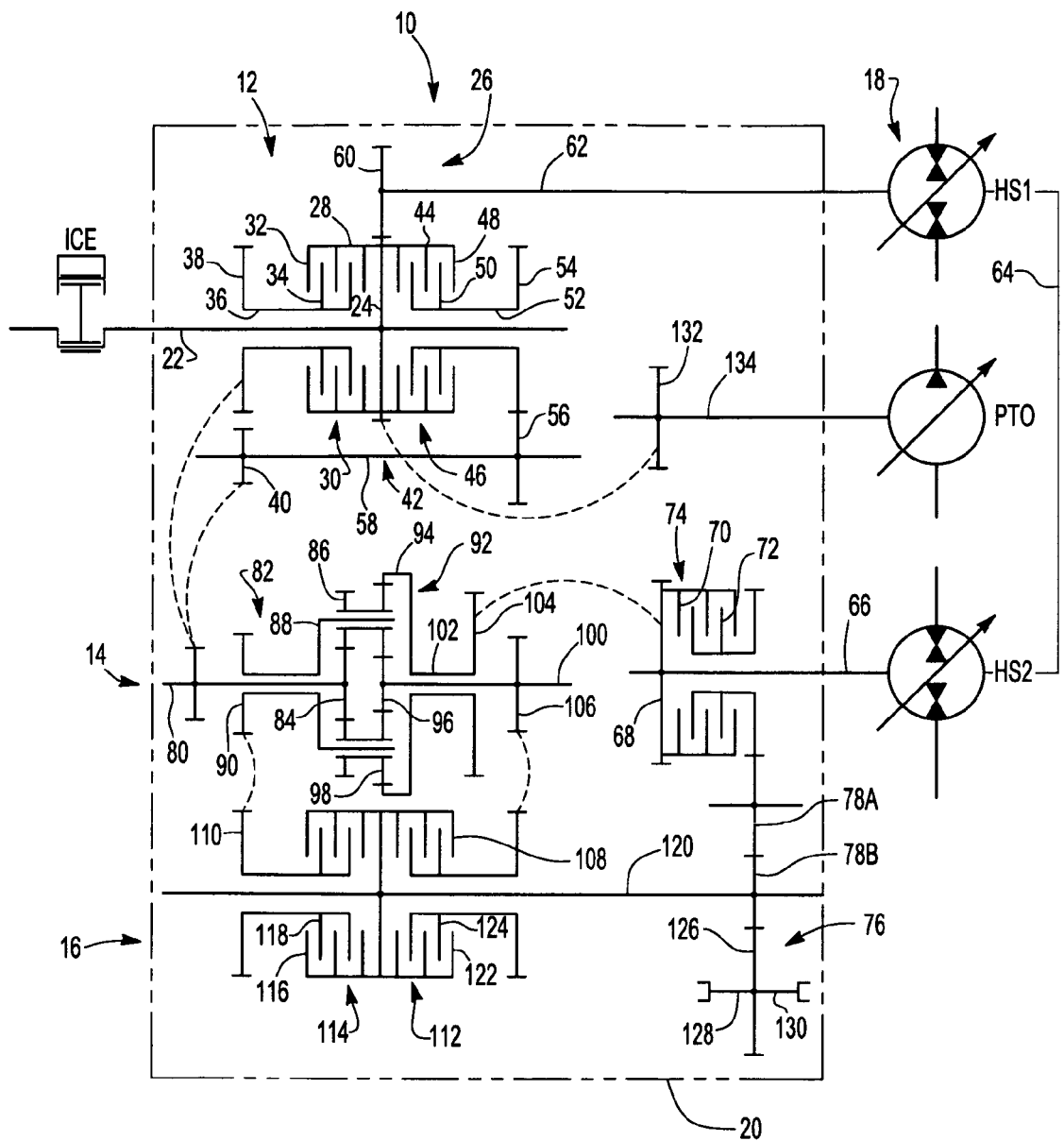

POWER SPLIT TRANSMISSION

RELATED APPLICATIONS

This application claims benefit from, and incorporates by reference in its entirety, U.S. Provisional Patent Application Ser. No. 61/228,646 filed on Jul. 27, 2009.

FIELD OF THE INVENTION

The present invention relates to transmissions for transmitting rotary motion and, more particularly, to an input coupled power split transmission.

BACKGROUND OF THE INVENTION

In a working machine, such as earth moving machinery, the internal combustion engine (ICE) supplies power for propelling the working machine in the forward and reverse directions. The ICE also supplies power for the actuation of all of the installed machine implements. A transmission is coupled to the engine and transmits power from the engine to the drive train to propel the working machine in the desired direction and speed.

The working machine operates at relatively low speeds and in cyclical work routines, thus there is a need to control speed precisely at low speeds and to adjust it infinitely throughout the full working range.

It is desirable to utilize a continuously variable transmission (CVT) and manage the transmission ratio to thereby save engine power for the actuation of the implements and also to provide a continuously variable power flow through the transmission to improve machine productivity.

Furthermore, CVTs provide stepless shifting in working machine operation, allowing the engine to operate at an optimal speed range. This results in lower fuel consumption or lower emissions than the fuel consumption or emissions of a conventional transmission. However, typical CVTs suffer from lower efficiency or lower torque handling capabilities than conventions transmissions.

It would therefore be advantageous to combine the variability of the CVT with the efficiency of a mechanical transmission, to provide potential benefits for off road vehicles specifically. These so-called power split drives are known, but the technology is still in development.

In a power shift drive, a planetary gear set (PGS) is combined with a mechanical stepped path resulting in the coupling of a continuous variable speed control with a simultaneous high efficiency level from the mechanical gears. Unfortunately, known power shift drives capable of meeting speed and torque requirements suffer from high complexity and cost.

The present invention is directed to overcoming one or more of the problems as set forth above.

SUMMARY OF THE INVENTION

The present invention is directed toward an input coupled power split transmission utilizing a planetary gearing mechanism, a directional mechanism, a stepped transmission, and a continuously variable ratio device, with a focus on efficiency, control effort, and low system complexity. In one embodiment, the planetary gearing mechanism, the directional mechanism, the stepped transmission and the continuously variable ratio device may be designed as discrete modules.

The planetary gearing mechanism may be said to generally have four members. A first member of the planetary gearing mechanism is connectable to the directional mechanism. A second member of the planetary gearing mechanism is connected to the continuously variable ratio device. And, a third member and a fourth member of the planetary gearing mechanism are connectable to an output section of the transmission.

The transmission as described above advantageously results in two full mechanical modes during the vehicle's speed range, allowing the transmission to take greater advantage of its highly efficient mechanical path. The hydrostatic units, part of the continuously variable ratio device, as a result of their layout, are compact and are operated within a high efficiency spectrum.

A full hydrostatic mode at low speed for precise positioning is a possible driving mode. Another possible driving mode is a direct drive at full speed for maximum fuel economy. Few switching steps are needed to cover the entire vehicle speed range. When switching is required, it may be done so without interrupting traction but still smoothly. The transmission also provides for fail safe operation due to the modes of operation.

BRIEF DESCRIPTION OF THE DRAWINGS

The above, as well as other advantages of the present invention, will become readily apparent to those skilled in the art from the following detailed description when considered in the light of the accompanying drawings in which:

FIG. 1 is a schematic of one embodiment of a power split transmission.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Turning now to FIG. 1, one embodiment of a power split transmission 10 of the present invention is schematically depicted. The transmission 10 comprises four modules: a directional mechanism 12, a planetary gear mechanism 14, a stepped transmission 16 and a continuously variable ratio device 18. Each of the modules may be stand alone-type modules, which permits modules with particular performance characteristics to be selectively inserted into and utilized in the transmission 10. The modular nature of the transmission 10 also facilitates repair and replacement of modules.

FIG. 1 depicts the directional mechanism 12, the planetary gear mechanism 14 and the stepped transmission 16 located in a single housing 20. The continuously variable ratio device 18 is depicted outside of the housing 20 in FIG. 1, however, it is permissible for the device 18 to also be located within the same housing 20 as the others.

The directional mechanism 12 is connected to an internal combustion engine (ICE). More particularly, the directional mechanism 12 may be directly connected to the ICE through an input shaft 22. When energized, the ICE provides rotation to the input shaft 22.

A first gear 24 is mounted directly on the input shaft 22. The first gear 24 is connected to a pump drive gear arrangement 26, described in additional detail below.

A first member 28 of a forward direction clutch 30 is connected for rotation with the input shaft 22. The first member 28 may be drivingly connected to the input shaft 22 through the first gear 24. The first member 28 is concentric with and located radially outward from the input shaft 22.

A first plurality of discs 32 is mounted on the first member 28 for rotation therewith. The discs 32 are permitted to selectively slide in the axial direction along the first member 28. The first plurality of discs 32 is interleaved with a second plurality of discs 34 mounted on a second member 36 of the forward direction clutch 30. The second plurality of discs 34 is also permitted to selectively slide in the axial direction along the second member 36.

The second member 36 may be concentric with the input shaft 22 and located radially outward from the input shaft 22 but located radially inward from the first member 28. The second member 36 may be at least partially concentric with the first member 28.

An actuator (not shown) may be selectively engaged to compress the first plurality of discs 32 and the second plurality of discs 34 together such that the friction between them causes them to rotate together.

A forward gear 38 mounted on the second member 36 rotates when the forward clutch 30 is so engaged. The forward gear 38 is connected to a forward idler 40 on an idler mechanism 42.

Similarly, a first member 44 of a reverse direction clutch 46 is connected for rotation with the input shaft 22. The first member 44 may be drivingly connected to the input shaft 22 through the first gear 24. The first member 44 is concentric with and located radially outward from the input shaft 22.

A first plurality of discs 48 is mounted on the first member 44 for rotation therewith. The discs 48 are permitted to selectively slide in the axial direction along the first member 44. The first plurality of discs 48 is interleaved with a second plurality of discs 50 mounted on a second member 52 of the reverse direction clutch 46. The second plurality of discs 50 is also permitted to selectively slide in the axial direction along the second member 52.

The second member 52 may be concentric with the input shaft 22 and located radially outward from the input shaft 22 but located radially inward from the first member 44. The second member 52 may be at least partially concentric with the first member 44.

An actuator (not shown) may be selectively engaged to compress the first plurality of discs 48 and the second plurality of discs 50 together such that the friction between them causes them to rotate together.

A reverse gear 54 mounted on the second member 52 rotates when the reverse clutch 46 is engaged. The reverse gear 54 is connected to a reverse idler 56 on the idler mechanism 42.

The idler mechanism 42 comprises the reverse idler 56 and the forward idler 40 and an idler shaft 58 connecting the two idlers 56, 40. The idler shaft 58 may be one piece or it may comprise multiple pieces connected together.

The forward direction clutch 30 and the reverse direction clutch 46 are located in a back-to-back arrangement within the directional mechanism 12.

The continuously variable ratio device 18 comprises a hydrostatic transmission which includes a variable displacement pump HS1. The pump HS1 is connected to the ICE through the pump drive gear arrangement 26, which includes the first gear 24 mentioned above. The first gear 24 is connected to a pump drive gear 60, which is connected to a pump drive shaft 62. The pump drive shaft 62 drives the variable displacement pump HS1.

The continuously variable ratio device also comprises a hydrostatic motor HS2. The variable displacement pump HS1 is fluidly connected to the hydrostatic motor HS2 by one or more hoses 64, as shown in FIG. 1.

A driveshaft 66 is connected to the hydrostatic motor HS2 and extends into the housing 20 adjacent the planetary gear mechanism 14. A hydrostatic clutch gear 68 is mounted for rotation with the driveshaft 66. A first plurality of discs 70 is connected for rotation with the gear 68. Interwoven with the discs is a second plurality of discs 72. The two sets of discs 70, 72 and actuator comprise a hydrostatic clutch 74.

The actuator (not shown) may be selectively engaged to compress the first plurality of discs 70 and the second plurality of discs 72 together such that the friction between them causes them to rotate together.

The second plurality of discs 72 is connected to an output section 76 of the transmission 10 by one or more gears 78A, 78B. The above-described connection permits the hydrostatic motor HS2 to provide direct drive to the vehicle, as described in more detail below.

The planetary gear mechanism 14 is provided with an input member 80. The input member 80 is drivingly connected to one of the direction clutches 30, 46, such as through the forward idler 40, the reverse idler 56, or the second member 36.

The input member 80 is drivingly connected to a first planetary gear set 82. The first planetary gear 82 set is comprised of a first planetary sun gear 84 and at least two planet gears 86. The input member 80 is directly connected to the first planetary sun gear 84. The number of planet gears 86 may vary from two, and all of the planet gears 82 are secured for rotation with a carrier 88. The carrier 88 has an output gear 90 located thereon. The planet gears 86 are all meshed with the sun gear 84.

The carrier 88 and the carrier output gear 90 are concentric with and located radially outward from the input member 80.

The planetary gear mechanism 14 also comprises a second planetary gear set 92. The second planetary gear set 92 comprises a ring gear 94, a second planetary sun gear 96 and at least two planet gears 98. The planet gears 98 are located on the same carrier 88 mentioned above, however, unlike before, these planet gears 98 are also meshed with the ring gear 94.

A second shaft 100 axially aligned with the input shaft 80 is also part of the planetary gear mechanism 14. The second shaft 100 has mounted thereon the second planetary gear set sun gear 96. The second planetary gear set planet gears 98 are meshed with the sun gear 96.

The ring gear 94 is concentric with the second shaft 100. A sleeve 102 connects the ring gear 94 with a first output gear 104. The first output gear 104 is connected to the hydrostatic clutch gear 68.

A second output gear 106 on the planetary gear mechanism 14 is connected to a high clutch gear 108 of the stepped transmission 16. More particularly, the second output gear 106 is mounted directly on the second shaft 100.

The carrier output gear 90 on the first planetary gear set 82 is connected to a low clutch gear 110 of the stepped transmission 16.

The stepped transmission 16 comprises the low clutch gear 110 and the high clutch gear 108, as well as a high clutch 112 and a low clutch 114. The low clutch gear 110 is connected to a first plurality of discs 116. The first plurality of discs 116 is interleaved with a second plurality of discs 118 connected to a stepped transmission output shaft 120. Similarly, the high clutch gear 108 is connected to a first plurality of discs 122.

The first plurality of discs 122 is interleaved with a second plurality of discs 124 connected to the stepped transmission output shaft 120.

The shaft 120 extends to the output section 76 of the transmission 10. One of the gears 78B from the hydrostatic clutch 74 is connected with the shaft 120. One or more gears 126 is connected from the shaft 120 to a front propeller shaft 128 and/or a rear propeller shaft 130 to provide rotational power to the front and/or rear wheels.

The power split transmission 10 may also have a power take off unit PTO. The power take off unit PTO may be connected to the first gear 24 in the directional mechanism 12. More particularly, in one embodiment, the first gear 24 is connected to a power take off gear 132. The power take off gear 132 is connected, or mounted to, a power take off shaft 134 for providing rotational power to the power take off unit PTO.

Based on the foregoing, it can be appreciated that when the forward direction clutch 30 and either the low or high clutch 114, 112, in the stepped transmission 16 are engaged, a forward direction of the vehicle is achieved. When the reverse direction clutch 46 and either the low or high clutch 114, 112, in the stepped transmission 16 are engaged, a reverse direction of the vehicle is achieved because of the idler mechanism 42 located between the directional mechanism 12 and the input member 80 of the planetary gear mechanism 14. When both the forward and the reverse direction clutches 30, 46, are disengaged, the directional mechanism 12 is in neutral with no power being transmitted from the directional mechanism 12 to the planetary gear mechanism 14.

The stepped transmission 16 expands the range of the transmission through engagement of the high and low clutches 112, 114, selectively connecting different members of the planetary gear mechanism 14 to the output section 76.

Furthermore, the above-described arrangement also permits the simultaneous engagement of both the high and low clutches 112, 114, forcing the planetary gear mechanism 14 to run as a solid member, operating a mechanical connection between the engine (ICE) and the output section 76.

Preferably, the vehicle starts to move in full hydrostatic mode. Thus, the hydrostatic motor HS2 is first connected to the output section 76 of the transmission 10 via the above-described hydrostatic clutch 74 and gearing 78A, 78B. Beginning in this mode, the vehicle takes advantage of the unique performance characteristics of the continuously variable ratio device 18, such as reversing performance, quick acceleration and deceleration, and smooth and precise control of speed and position.

As vehicle speed increases, the low speed regime within the transmission is then selected. More particularly, the low speed regime is obtained by connecting the input member 80 of the planetary gear mechanism 14 by means of the forward directional clutch 30 and the output of the planetary gear mechanism 14 to the output section 76 of the transmission 10 by means of the low clutch 114.

If additional vehicle speed is required, the hydrostatic motor HS2 rotates to its maximum speed. To engage the high speed regime, the high clutch 112 engages, connecting the output of the planetary gear mechanism 14 to the output section 76 of the transmission 10, while the low clutch 114 disengages. The variable displacement pump HS1 and hydrostatic motor HS2 operate at continuous speeds and displacements during the regime shift without discontinuity. The hydrostatic unit HS2 begins to decelerate as vehicle speed increases.

As the vehicle speed further increases, a synchronous speed mode could be achieved in the planetary gear mechanism 14. More particularly, the synchronous speed mode is achieved while engaging both low and high clutches 112, 114. From the synchronous speed mode on, a mechanical connection between the engine (ICE) and the output section 76 of the transmission 10 is performed.

The necessity of a dedicated reverse gear 54 rather than utilizing the hydrostatic transmission to browse reverse speeds depends on the relative reverse speed of the vehicle compared to the forward speed. For systems that require a reverse speed of similar magnitude to their forward speed, such as a wheel loader, the transmission efficiency in reverse mode will decrease dramatically with speed and therefore a directional mechanism is necessary.

Where the transmission ratio spread is being optimized around fuel economy, the engine isometric fuel map is considered (an emission map might be alternatively used to minimize emissions). As the control system is able to drive the engine's throttle position independently of the driver's accelerator pedal, and because the transmission allows any engine speed to be selected for a given vehicle speed (rather than a constrained number of fixed speeds with a conventional manual or automatic transmission), the strategy to run along the optimum control line can be implemented. The engine speed can always be adjusted to a point where the total power loss of the transmission is minimized.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A transmission, comprising:
    a directional mechanism comprising an input shaft driving a forward direction clutch, a reverse direction clutch and a first gear;
    a planetary gear mechanism connected to said directional mechanism comprising a first sun gear, a first planet set, a carrier, a second planet set, second sun gear and a ring gear;
    a stepped transmission connected to said planetary gear mechanism comprising a high clutch and a low clutch; and
    a continuously variable ratio device connected to said directional mechanism and said planetary gear mechanism comprising a variable displacement pump and a hydrostatic motor;
    wherein said first sun gear is directly drivingly connected to said forward direction clutch or said reverse direction clutch via a planetary gear mechanism input member, said carrier directly drivingly connected to said stepped transmission, said ring gear drivingly directly connected to a hydrostatic clutch connected to said hydrostatic motor.

2. The transmission of claim 1, wherein the directional mechanism is drivingly connected to an internal combustion engine by said input shaft.

3. The transmission of claim 1, wherein said first gear is connected to said input shaft, said first gear driving a first plurality of discs for said forward direction clutch and a first plurality of discs for said reverse direction clutch.

4. The transmission of claim 3, wherein a second plurality of discs for said forward direction clutch are interleaved with said first plurality of discs for said forward direction clutch, said second plurality of discs connected to a forward gear and a second plurality of discs for said reverse direction clutch are interleaved with said first plurality of discs for said reverse direction clutch, said second plurality of discs connected to a reverse gear.

5. The transmission of claim 4, wherein an input member of said planetary gear mechanism is connected to said forward gear of said directional mechanism.

6. The transmission of claim 1, wherein said first gear drives a power take off shaft for a power take off (PTO) in said continuously variable ratio device.

7. The transmission of claim 1, wherein said carrier is connected to a low clutch gear of said low clutch.

8. The transmission of claim 1, wherein said carrier supports thereon said first planet set and said second planet set.

9. The transmission of claim 8, wherein said second planet set is engaged with said ring gear, said ring gear being connected to a sleeve concentric with a shaft, said sleeve having a first output gear thereon.

10. The transmission of claim 9, wherein said first output gear is connected to a hydrostatic clutch connected to said hydrostatic motor.

11. The transmission of claim 10, wherein said shaft has a second output gear connected to a high clutch gear of said high clutch.

12. The transmission of claim 11, wherein said low clutch and said high clutch are connected to a stepped transmission output shaft connected to a transmission output section.

13. The transmission of claim 12, wherein said hydrostatic clutch is connected to said transmission output section.

14. A transmission, comprising:
a directional mechanism comprising an input shaft driving a back-to-back forward and reverse direction clutches, said input shaft also driving a variable displacement pump of a continuously variable ratio device;
a planetary gear mechanism comprising a first planetary gear set and a second planetary gear set, said gear sets sharing a single planet carrier wherein said first planetary gear set is connected to said forward direction clutch and said second planetary gear set is connected to a hydrostatic clutch of said continuously variable ratio device;
a stepped transmission comprising a low clutch and a high clutch, said low clutch being connected to said first planetary gear set and said high clutch being connected to said second planetary gear set, wherein both of said clutches are connected to a transmission output section; and
a hydrostatic motor connected to both said hydrostatic clutch and said variable displacement pump, wherein said hydrostatic clutch is also connected to said transmission output section;
wherein said hydrostatic clutch comprises a shaft having a first end driven by said hydrostatic motor and a second end supporting a hydrostatic clutch gear, wherein said hydrostatic clutch gear is connected to said second planetary gear set, a first plurality of discs is connected to said hydrostatic clutch gear and a second plurality of discs is connected to said transmission output section.

15. The transmission of claim 14, wherein said first planetary gear set comprises said single planet carrier connected to said low clutch gear, a first sun gear and a first planet gear and said second planetary gear set comprises a second sun gear, a second planet gear and a ring gear, wherein said second planet gear mounted on said carrier is meshed with said ring gear.

16. A transmission, comprising: a continuously variable ratio device comprising a variable displacement pump in fluid communication with a hydrostatic motor, wherein said pump is driven by a gear connected to an input shaft, said input shaft driving both a forward direction clutch and a reverse direction clutch, and wherein said motor is connected to one of two planetary gear sets and a transmission output section, said planetary gear sets connected to a high and low clutch, said planetary gear sets sharing a common planet carrier supporting two sets of planetary gears wherein a first sun gear is directly drivingly connected to said forward direction clutch or said reverse direction clutch via a planetary gear mechanism input member, said planet carrier directly drivingly connected to a stepped transmission, wherein a ring gear is drivingly connected to a hydrostatic clutch connected to said hydrostatic motor.

* * * * *